United States Patent
Weigl et al.

(10) Patent No.: US 7,761,634 B2
(45) Date of Patent: Jul. 20, 2010

(54) METHOD, DEVICE AND SYSTEM FOR EXCHANGING DATA VIA A BUS SYSTEM

(75) Inventors: Andreas Weigl, Linkenheim-Hochstetten (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/560,959

(22) PCT Filed: Apr. 7, 2004

(86) PCT No.: PCT/EP2004/050466

§ 371 (c)(1),
(2), (4) Date: Dec. 14, 2005

(87) PCT Pub. No.: WO2004/111859

PCT Pub. Date: Dec. 23, 2004

(65) Prior Publication Data

US 2006/0174042 A1     Aug. 3, 2006

(30) Foreign Application Priority Data

Jun. 18, 2003   (DE)   ................. 103 27 548

(51) Int. Cl.
*G06F 13/362* (2006.01)
*G06F 13/00* (2006.01)
*G06F 1/12* (2006.01)
*H04J 3/06* (2006.01)

(52) U.S. Cl. .............. 710/117; 710/110; 370/503; 713/400

(58) Field of Classification Search ............ 710/110, 710/117; 713/400; 370/503
See application file for complete search history.

(56) References Cited

U.S. PATENT DOCUMENTS 5,598,579 A * 1/1997 Welker et al. ............. 710/22

(Continued)

FOREIGN PATENT DOCUMENTS

DE    100 00 302    7/2001

(Continued)

OTHER PUBLICATIONS

Rahul Shah & Xuanming Dong, An Introduction to TTCAN, EE2900 Class discussion, Mar. 7, 2002, pp. 9-34.*

(Continued)

*Primary Examiner*—Mark Rinehart
*Assistant Examiner*—Christopher A Daley
(74) *Attorney, Agent, or Firm*—Kenyon & Kenyon LLP (57) ABSTRACT

A method for exchanging data in messages between at least two stations connected via a bus system. The messages contain the data being transmitted by the stations over the bus system, and the messages are controlled over time by a first station in such a manner that the first station repeatedly transmits a reference message containing time information of the first station over the bus system at least one specifiable time interval. The time interval is subdivided as a basic cycle into time windows of specifiable length, and the messages are transmitted in the time windows. When data is exchanged, a pause period of variable duration is provided at the end of at least one basic cycle, by which a time change of the beginning of the basic cycle is corrected by adaptation of the duration of the pause period.

10 Claims, 6 Drawing Sheets

U.S. PATENT DOCUMENTS

| | | | | |
|---|---|---|---|---|
| 5,666,358 | A | * | 9/1997 | Paratore et al. ............. 370/347 |
| 5,694,542 | A | * | 12/1997 | Kopetz ........................ 714/49 |
| 6,111,888 | A | | 8/2000 | Hays et al. |
| 6,128,318 | A | * | 10/2000 | Sato ........................... 370/503 |
| 6,442,708 | B1 | * | 8/2002 | Dierauer et al. ............... 714/25 |
| 6,516,364 | B1 | | 2/2003 | Bott et al. |
| 6,769,038 | B1 | * | 7/2004 | Grzybowski et al. .......... 710/45 |
| 6,804,205 | B1 | * | 10/2004 | Nishimura et al. .......... 370/296 |
| 7,184,449 | B2 | * | 2/2007 | Spalink ...................... 370/508 |
| 7,441,048 | B2 | * | 10/2008 | Arnold et al. ............... 709/248 |
| 2002/0067737 | A1 | | 6/2002 | Wego |
| 2003/0070019 | A1 | | 4/2003 | Dalakuras et al. |
| 2004/0228366 | A1 | * | 11/2004 | Fuehrer et al. .............. 370/489 |

FOREIGN PATENT DOCUMENTS

| | | |
|---|---|---|
| DE | 100 00 0303 | 7/2001 |
| DE | 100 00 304 | 7/2001 |
| DE | 100 000 305 | 7/2001 |
| EP | 0 522 607 | 1/1993 |
| EP | 0 622 712 | 11/1994 |
| EP | 1115219 | 7/2001 |
| JP | 1994169495 | 7/1994 |
| JP | 2001251329 | 9/2001 |

OTHER PUBLICATIONS

An Introduction to TTCAN, Rahul Shah, Xuanming Dong, Mar. 7, 2002.*

FlexRay International Workshop, Claas Bracklo, Mar. 4, 2003.*

Scheduling for a TTCAN network with Stochastic Optimization Algorithm, Jose Fonseca, Fernanda Coutinho, Jorge Barreiros, Portugal.*

G. Leen et al, TTCAN: a new time-triggered controller area network, Dec. 14, 2001, Microprocessors and Microsystems 26, (2002) 77-94).*

Leen, G., et al., "TTCAN: A new time-triggered controller area network", Microprocessors and Microsystems, IPC Business Press Ltd., London, Great Britain, vol. 26, No. 2, Mar. 17, 2002, pp. 77-94.

ISO 118-4:2004—Aug. 5, 2005.

Florian Hartwiich, et al, Timing in the TTCAN Network, Robert Bosch GmbH Proceedings 8$^{th}$ International CAN Conference.

* cited by examiner

METHOD, DEVICE AND SYSTEM FOR EXCHANGING DATA VIA A BUS SYSTEM

FIELD OF THE INVENTION

The present invention relates to a method, device, and a system for exchanging data such as in messages between at least two stations connected via a bus system.

BACKGROUND INFORMATION

The networking of control units, sensors and actuators using a communications system or a bus system has increased dramatically in recent years not only in modern motor vehicle manufacturing and in engineering, especially in the machine tool sector, and automation technology and other industrial applications, but also in the private sector, for example in bus systems for domestic buildings. It is possible in these cases to obtain synergetic effects by distributing functions among several control units. The term distributed systems is used for this. Communication between various stations of such a system is increasingly taking place via at least one bus or at least one bus system. The communications traffic on the bus system, access and receiving mechanisms, and error handling are governed by a protocol.

A protocol that is established in the automotive sector and which is also being used to an increasingly greater extent in other applications is CAN (Controller Area Network). This is an event-triggered protocol, that is to say, protocol activities such as transmission of a message are initiated by events that originate outside the communications system. Unique access to the communications system or bus system is resolved by priority-based bit arbitration. A pre-requisite for this is that each message be assigned a priority. The CAN protocol is very flexible; it is therefore possible for further nodes and messages to be added without any difficulty as long as there are still free priorities (message identifiers) available. The collection of all of the messages to be transmitted in the network, including priorities and their transmitting nodes, and possibly receiving nodes, are stored in a list known as the communication matrix.

An alternative approach to event-triggered, spontaneous communication is the purely time-triggered approach. All communication activities on the bus are in that case strictly periodic. Protocol activities such as the transmission of a message are triggered only by the passage of a time applicable to the entire bus system. Access to the medium is based on the allocation of time ranges in which a transmitting station has an exclusive transmission right. The protocol is comparatively inflexible, and adding new nodes is possible only if the corresponding time ranges were left free beforehand. This circumstance forces the order of the messages to be set before operation is started. At the same time, the positioning of the messages within the transmission periods must also be synchronized with the applications producing the contents of the messages so that the latencies between the application and the instant of transmission are kept to a minimum; otherwise, that is to say, if that synchronization is not performed, the advantage of time-triggered transmission—minimal latency jitters when the message is being sent over the bus—would be destroyed.

The approach using time-triggered CAN, the so-called TTCAN (Time Triggered Controller Area Network), which is described in German Patent Application Nos. 100 00 302, 100 00 303, 100 00.304 and 100 00 305, and in ISO Standard 11898-4 satisfies the requirements outlined above for time-triggered communication and satisfies the requirements for a certain degree of flexibility. The TTCAN fulfills those requirements by structuring the communication round (basic cycle) into so-called exclusive time windows for periodic messages of specific communications stations, and into so-called arbitrating time windows for spontaneous messages of a plurality of communications stations. The TTCAN is generally based on time-triggered, periodic communication which is clocked by a station or node giving the main time, the so-called time master or timer, using a time reference message or short reference message. The period to the next reference message is referred to as the basic cycle and is subdivided into a specifiable number of time windows. A distinction is made between the local times, or the local timers, of the individual stations and the time of the timer giving the global time. Further fundamental principles and definitions relating to the TTCAN will be explained hereinafter or may be learned from ISO 11898-4 and the related art described above.

In the case of TTCAN bus communication, communication objects, especially messages, that are defective and that are marked and made invalid by an error frame are not repeated so as to avoid any risk of exceeding the time window or the cycle time by repeating the message and thereby impeding the message that follows. The receiving communication object for that destroyed message continues not to be updated until a message is received without error in an associated time window. In contrast to this, a defective reference message identified by an error frame is repeated, since it is not possible to do without that reference message. That repetition of the message results in the basic cycle affected being extended by the time from the beginning of the first defective reference message to the beginning of the reference message transmitted without error. Each of those errors leads to a further delay in the timing, with the result that those delays add up to a greater and greater deviation from the nominal time. Such a fault, for example a reference message transmitted with errors, accordingly leads to a time change or deviation from the nominal settings in the system. If two or more TTCAN buses or bus systems are in synchronized operation, such a time deviation, especially a delay, on one of the bus systems must be put into effect on the other bus system in order to obtain synchronism again. Accordingly, such time deviations on all the bus systems are added to one another and the fault or error is propagated.

SUMMARY

An object of the present invention is to compensate for such time deviations, especially delays, caused by faults and thereby to obtain greater long-term accuracy of the timing of the communication and the communication matrix.

An example embodiment according to the present invention is not necessarily confined to the TTCAN, but may be extended to comparable bus systems and protocols as regards the requirements and constraints described hereinafter. For a clearer understanding, however, the TTCAN bus is taken as the basis for the following description.

In accordance with an example embodiment of the present invention, a method, device, and corresponding bus system, are provided for exchanging data in messages between at least two stations connected via a bus system. The messages contain the data being transmitted by the stations over the bus system, and the messages are controlled over time by a first station in such a manner that the first station repeatedly transmits a reference message containing time information of the first station over the bus system at least one specifiable time interval. The time interval is subdivided as a basic cycle into time windows of specifiable length. The messages are transmitted in the time windows. When data is exchanged, a pause period of variable duration may be provided at the end of at least one basic cycle, by which a time change of the beginning of the basic cycle is corrected by adaptation of the duration of the pause period. It is thereby possible to handle the above-described problems in the event of deviations with regard to the cycle time in one or more bus systems.

The time change in the form of a delay in the start of the basic cycle is advantageously corrected by shortening the duration of at least one pause period.

In different forms of application, a pause period may be provided at the end of every basic cycle or at the end of every $2^n$th basic cycle or at the end of every $2^n+1$th basic cycle, where n is a natural number (n∈N).

When a plurality of, i.e., at least two, successive basic cycles are considered, it is also possible to provide a plurality of pause periods, appropriate to the different forms of application, so that a time change of the beginning of at least one basic cycle may be distributed over a plurality of, and especially at least two, pause periods, and a correction may thereby be made.

A correction value may advantageously be determined for this, which is found from a local time of a station and a cycle time. The correction value is advantageously determined from a first difference between two local times of a station in two successive basic cycles. In addition, the correction value is dependent on a second difference between two cycle times of two successive basic cycles. The correction value may also advantageously be dependent on a comparison value formed by the sum of the time interval of the basic cycle and the above-mentioned second difference, so that the correction value corresponds to the difference between the first difference and the comparison value.

It is thus advantageously possible, when at least two pause periods are used in at least two successive basic cycles when exchanging data, for the correction value to be distributed in a specifiable manner over the at least two pause periods, so that, if the duration of a pause period is not sufficient to correct the time deviation, time compensation is also possible over a plurality of pause periods and basic cycles. In particular, in this instance the correction value may be evenly distributed over the at least two pause periods rather than being distributed in a specifiable manner.

Further advantages and advantageous embodiments will be apparent from the description below.

BRIEF DESCRIPTION OF THE DRAWINGS

The present invention is described in detail below with reference to the Figures.

DETAILED DESCRIPTION OF EXAMPLE EMBODIMENTS

Figure 1:
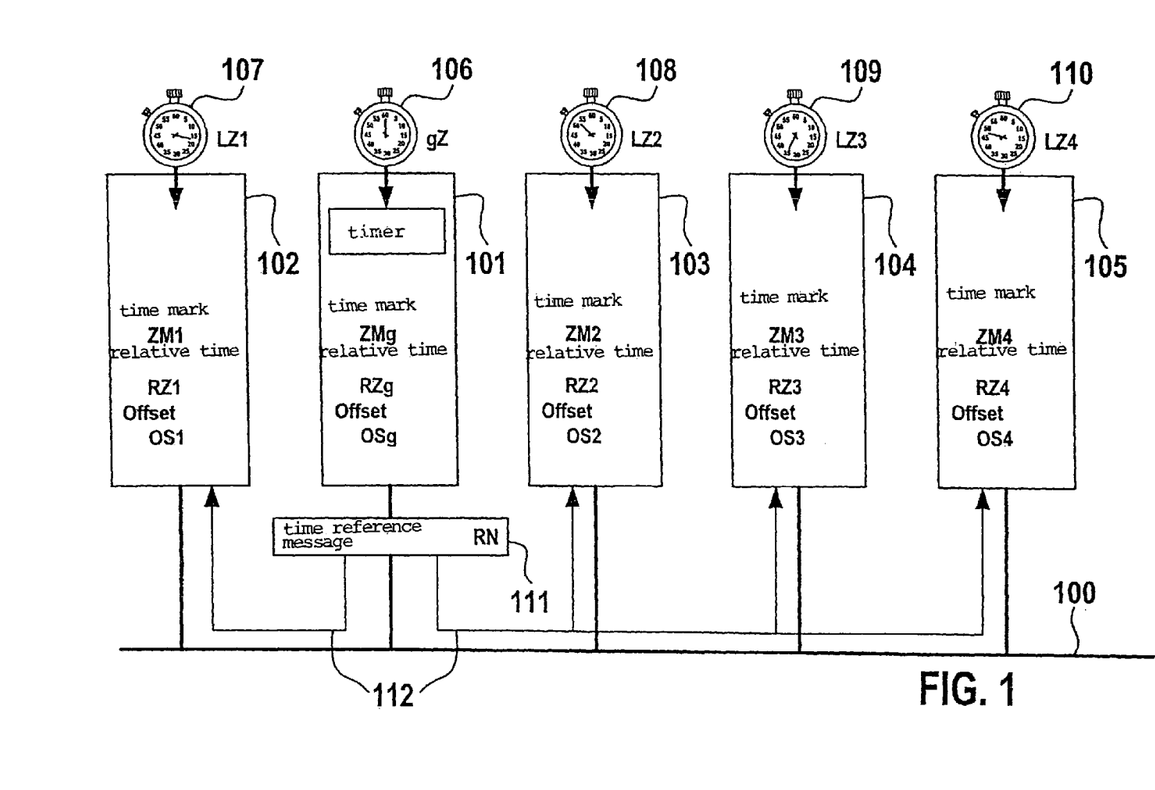
FIG. 1 shows a bus system having a plurality of stations.

TTCAN is generally based on time-triggered periodic communication which is clocked by a timer (FIG. 1, 101) using a time reference message or short reference message RN. The time interval or the period up to the next reference message RN has the duration of cycle time ZZ. FIG. 1 shows a bus system 100 having a plurality of bus stations 101 to 105. Each station 101 to 105 has its own time basis 106 to 110 which on the one hand may be formed by an internal element, for example a clock, a counter, a clock generator etc. or may be transmitted to the respective station from the outside. The respective local time basis LZ1 to LZ4 is, for example, especially a counter, for example a 16-bit incremental counter, that may be influenced only by a hard reset. A local time basis is implemented here in each station 102 to 105. One specific station, the timer, in this case 101, has an exposed position. Its time basis 106 is referred to as the global time basis having the global time GZ and is either implemented in the timer 101 or transmitted thereto from the outside. The global time GZ is formed in principle in each station by the local time basis 107 to 110, or the local time LZ (LZ1 to LZ4), and an offset OS1 to OS4. That offset OSG in the timer 101 is normally 0 (OSG=0). All the other stations form their view of the global time GZ from their local time LZ (LZ1 to LZ4) and the local offset OS1 to OS4 (and in exceptional cases from OSG when OSG≠0, for example, when GZ is transmitted to timer 101 from the outside and the latter additionally contains its own time basis). The local offset is the difference between the local time at the instant of transmission (SOF, start of frame), of reference message RN and the global time information transmitted from the timer in or with that reference message RN. To determine specific points in time, for example to determine the offset relative to the respective local time and the global time, so-called time marks (timestamps) ZM1 to ZM4 and ZMG may be used, which may be stored in registers and from which it is possible to determine time correction quantities, for example the offset relative to the global time, or also a correction value for error handling, especially the correction value according to the present invention. A time mark is a relative point in time which establishes the relationship between the relative time and an action in the original bus (CAN controller). A time mark is represented as a register, a controller being capable of managing a plurality of time marks. A plurality of time marks may be assigned to a message.

Reference message RN is the basis for the time-triggered, periodic operation of TTCAN and arrow 112 indicates that reference message RN (111) is sent to the other stations (102 to 105). RN is clearly identified by a specific identifier and is received by all stations (in this case 102 to 105) as clocking information.

Figure 2:
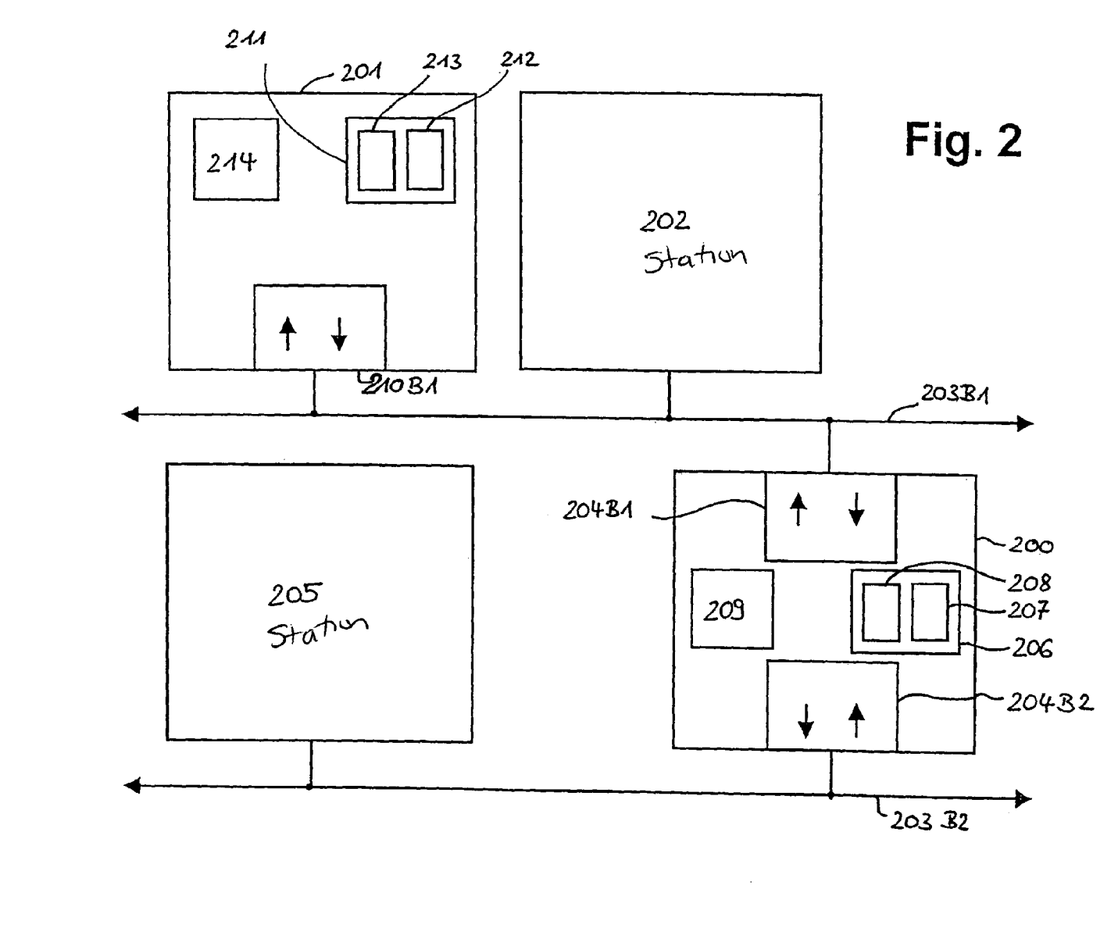
FIG. 2 shows a system having two bus systems which are coupled to each other.

FIG. 2 shows a system composed of a plurality of, and in this case two, TTCAN bus systems. 203B1 denotes therein a first bus, and 203B2 a second bus. Two stations 201 and 202 are coupled to the first bus 203B1. One station 205 is coupled to the second bus 203B2. Station 200 is connected to both buses 203B1 and 203B2 and acts as a connecting station or as a gateway computer, or as gateway station or gateway controller, which has access to both bus systems. Connection of the individual stations to the respective bus system is via an appropriate interface element, for example interface element 210B1 in the case of station 201. Station 200 is similarly connected as a gateway station via an interface element 204B1 to bus 203B1 and via an interface element 204B2 to bus 203B2. Alternatively, in contrast to providing two interface elements 204B1 and 204B2, it would be possible to provide one interface element that has two terminals for connection to bus 203B1 and to bus 203B2. Also shown in station 200 and 201 are a clock generator 211 and 206, respectively, and a timer component having an internal clock source or also a local time basis 207 and 212, respectively; especially a crystal or an oscillator, especially a VCO (voltage controlled oscillator). Present within the respective timer component 206 or 211 is a time-recording component, e.g., a counter 208 or 213, respectively.

Control functions in the respective station, especially for the input/output of data on the bus system, for taking time information from the timer component, or also the calculation of the offset and the determination of the correction values for comparison of the time marks and for synchronizing the buses and bus stations, and further processes and process steps may be performed by components 209 and 214 forming processing components, especially a microcomputer or microprocessor or also a controller. Parts of those functionalities or the entire functionality may, however, be present directly, that is, implemented, in the respective interface component. In addition to every other station, in this case the gateway station also may be specified as the timer of the global time, that is to say, as the sender of the reference message, especially for both bus systems. Essentially, therefore, the system composed of at least two bus systems shown in FIG. 2 is to be regarded for each bus system in the same manner as the system having one bus system which is shown in FIG. 1, it being necessary for the various bus systems to be synchronized, especially in applications where safety is critical. As a result, the errors described in the introduction propagate from one bus system to the other.

Figure 3:
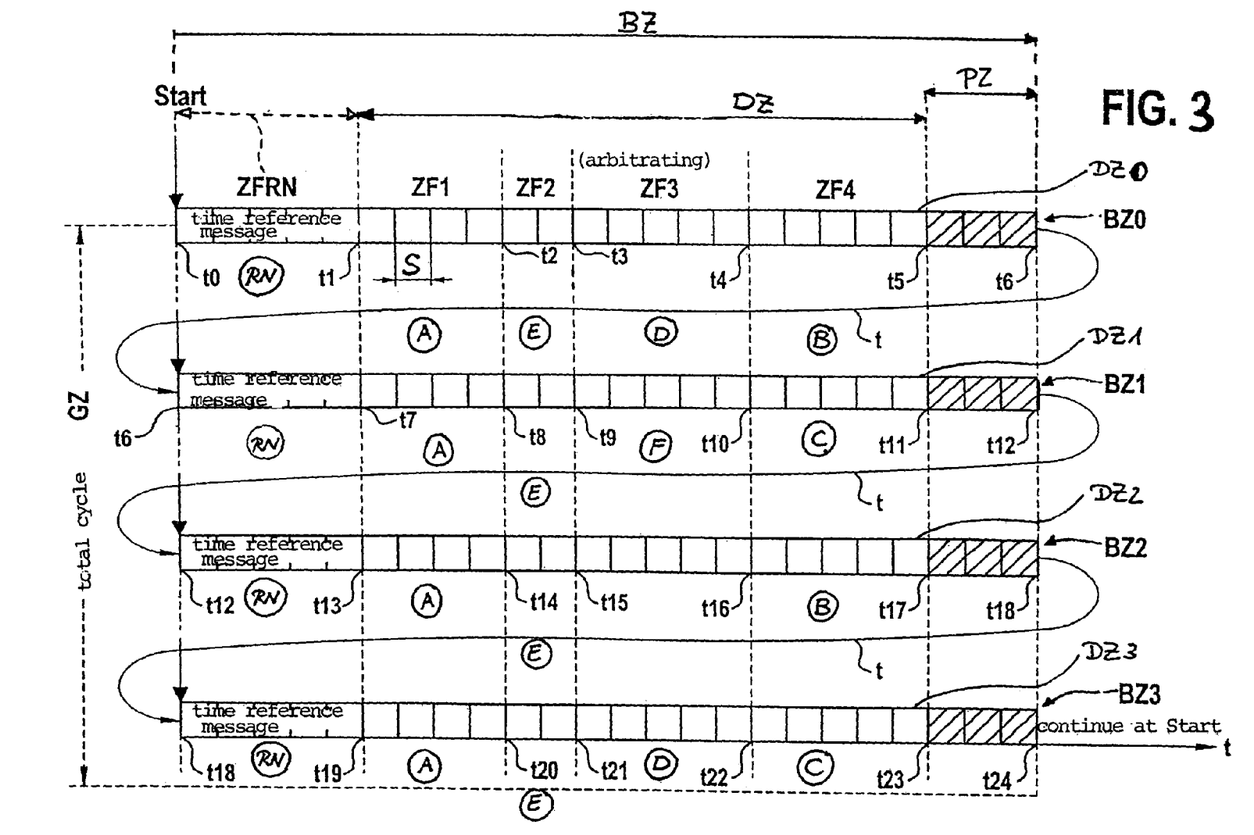
FIG. 3 shows a total cycle for exchanging data, having a plurality of basic cycles.

FIG. 3 shows the principle of exchanging data by time-triggered, periodic transmission of messages over time. That message transmission is clocked by the timer of the respective bus system using reference message RN. By definition, basic cycle BZ may, as shown here, include the actual time windows for messages ZF1 to ZF4 and also ZFRN, the time window for the reference message, and a pause period PZ. Cycle time ZZ generally corresponds to the time for such a basic cycle.

For the sake of clarity, the time windows for data transmission ZF1 to ZF4 will be referred to hereinafter as data cycle DZ, cycle time ZZ including reference message RN in basic cycle BZ and also pause period PZ, in this case from t0 to t6, t6 to t12, t12 to t18, and t18 to t24. This accordingly gives in the example illustrated 4 data cycles DZ0 to DZ3 similarly in 4 basic cycles BZ0 to BZ3.

As shown, from t0 to t1, t6 to t7, t12 to t13 and t18 to t19, i.e., in time window ZFRN, reference messages RN of the respective basic cycles BZ0 to BZ3 are transmitted. The structure of the time windows ZF1 to ZF4 that follow a reference message RN, i.e., their length in segments S, their number and their position in time, may be specified. It is thereby possible to form from a plurality of basic cycles with their associated reference messages, data cycles and pause periods a total cycle GZ which begins at t0 and ends at t24, in order to be repeated again. Time windows ZF1 to ZF4 include, for example, from two to five segments S each having, for example, 16, 32, 64, etc. bit times. The messages sent are shown circled in FIG. 3 as RN and A to F. All of those messages of all the stations of at least one bus system are organized as components of a matrix that represents the total cycle GZ, the so-called communication matrix. That communication matrix is composed, therefore, of the individual cycles BZ0 to BZ3 with their associated reference message RN, corresponding data cycle DZ0 to DZ3 and associated pause period PZ. Those data cycles DZ0 to DZ3 may optionally be made up of exclusive and arbitrating components. For example, on the one hand, an entire time window, such as ZF3 here, may be specified as being arbitrating in accordance with CAN or, alternatively, only a single element of a basic cycle or data cycle, such as, for example, from t15 to t16. It is possible here for the arrangement of the messages (A to F) within basic cycles BZ and data cycles DZ to be freely specified. A time window ZFx is linked for exclusive components to a CAN message object, it also being possible for a time window to be left empty or used for arbitrating components.

According to an example embodiment of the present invention, therefore, a communication matrix in TTCAN is composed either of basic cycles with nothing but data cycles of equal length with reference message or it may add a pause, that is, a pause period PZ, in the data traffic after one or more data cycles, which pause period (PZ) is ended, for example, by an event, such as a new reference message. In FIG. 3, in one particular application a pause period PZ is provided after every data cycle, i.e., in every basic cycle, in this case therefore from t5 to t6, t11 to t12, t17 to t18 and t23 to t24. According to the present invention, it is also possible, however, for such a pause period to be provided only after one data cycle or after every even number of data cycles, that is to say, $2^n$ where n is a natural number. Similarly, such a pause period PZ may also occur after every odd number of data cycles, that is to say, at $2^n+1$, again with n as a natural number. Accordingly, the length of a basic cycle or the duration of the cycle time ZZ is made up of the time window for the reference message ZFRN, the data cycle DZ and, as shown here in FIG. 3, the pause period PZ, that is to say, of a larger fixed part and a smaller pause. This method allows adaptation of the cycle time by adaptation of pause period PZ. It is thereby possible to compensate for faults, especially delays caused by message repetitions, in particular of reference message RN, during one or more cycles. A pause that is required after a data cycle, for example a pause necessitated by the system, may additionally be obtained by lengthening that cyclic pause period PZ. For reasons of notation, pause period PZ is included in the basic cycle. Basic cycle BZ, however, may refer to ZFRN plus DZ and the pause period may be regarded as being added, which, however, merely corresponds to a different notation and is just as advantageous to the concept of the present invention and cannot result in any limitation.

Figure 4A:
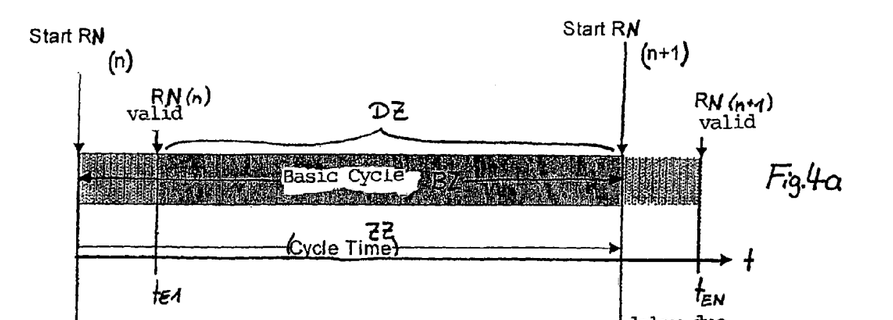
FIGS. 4a and 4b show the effect of a fault without the pause period according to an example embodiment of the present invention.
Figure 4B:
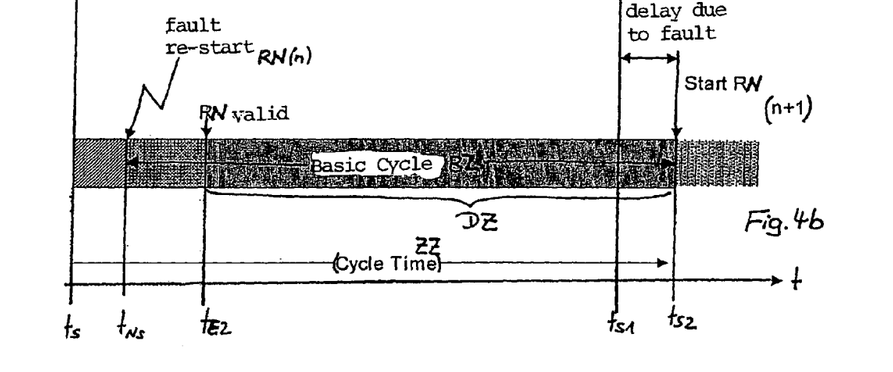
Figure 5A:
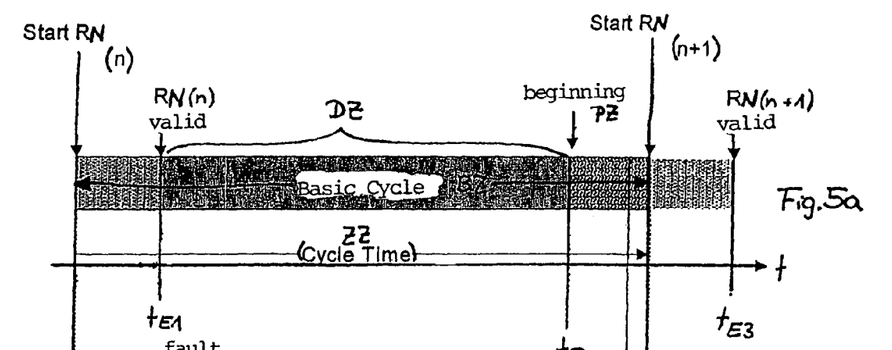
FIGS. 5a and 5b show the correction of a fault using the pause period according to an example embodiment of the present invention.
Figure 5B:
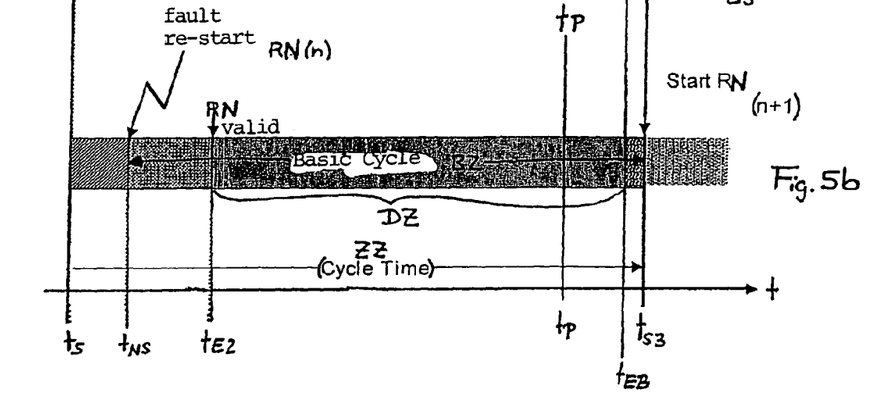
Figure 6A:
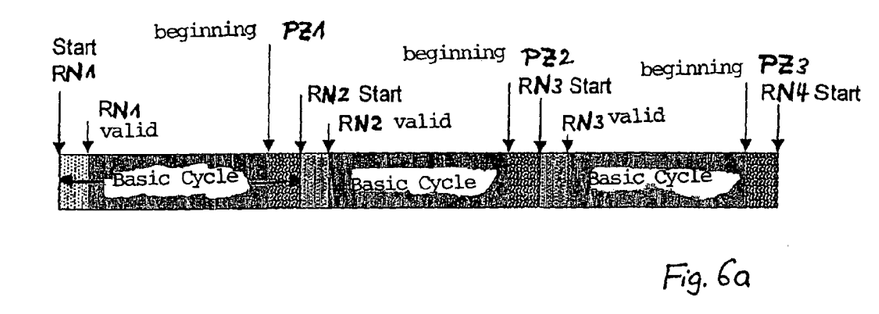
FIGS. 6a and 6b show a plurality of successive basic cycles with a correction according to an example embodiment of the present invention being determined.
Figure 6B:
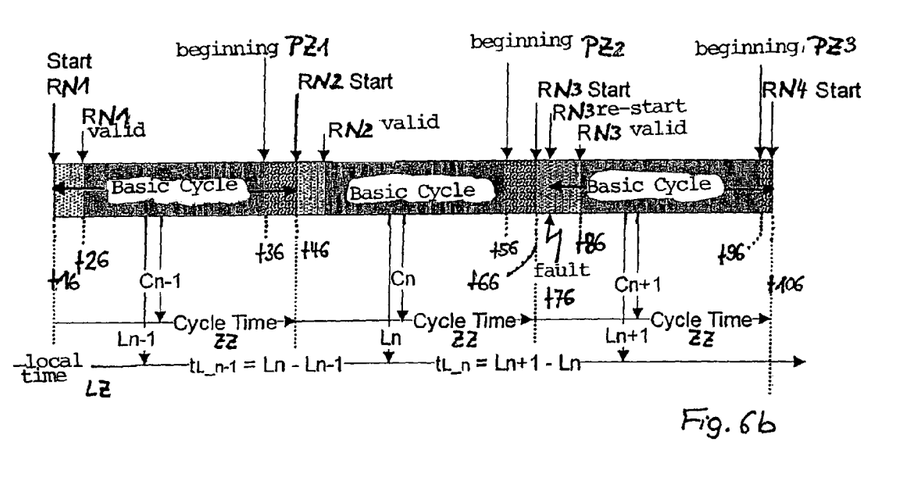

In FIGS. 4, 5 and 6, the example embodiment of the present invention will be described once more in detail.

FIG. 4a shows a normal procedure with reference message RN in basic cycle BZ without the use of the pause period PZ. At time ts, reference message RN(n) begins. At time tE1, RN(n) has been completely transmitted and is valid. At the end of cycle time ZZ, the next reference message RN(n+1) begins at time ts1, which is then valid at time tEN, and the next data cycle DZ follows. If, as shown in FIG. 4b, a fault occurs, a re-start of that reference message RN(n) takes place at time tNS. That is to say, a defective message identified by an error frame, specifically a defective reference message RN in the case of TTCAN, is repeated at that time tNS, since it is not possible to do without that reference message. That repeated reference message RN(n) is then valid at time tE2, whereupon data cycle DZ then follows in basic cycle BZ. That repetition of the message results, however, in the affected cycle time ZZ being extended and in the corresponding basic cycle BZ being shifted, in particular delayed. That is to say, at the actual start time of the next reference message RN(n+1), ts1, the basic cycle BZ has not yet ended and does not end until time ts2. The start of the subsequent reference message RN(n+1) does not occur until TS2, thereby producing a deviation, especially a delay, of ts2–ts1 caused by the fault, that is to say, the associated cycle time and the end of the basic cycle affected is extended by that time. Each of those errors or faults leads to a further delay in the timing, with the result that those delays add up to an increasingly greater deviation from the nominal time. In the case of two or more TTCAN buses that are to be synchronized, as shown in FIG. 2, such a delay on one of the bus systems must also be put into effect on the other bus system in order to achieve synchronism again, i.e., the time deviations, in particular delays, are added to one another on all the bus systems, thereby propagating the error or fault. With a cycle time ZZ of, for example, 900 bit times (ts1) and a transmission period for reference message RN of 55 bit times (tE1), if the re-start is able to take place after 40 bit times (tNS) there is accordingly such a shift or delay due to the fault of precisely 40 bit times (ts2–ts1).

In FIG. 5, which consists of FIGS. 5a and 5b, instead of the cycle time being extended and the constant basic cycle being shifted if necessary, cycle time ZZ will be composed of a constant time component, the very data cycle DZ and reference message RN, and of a variable component, a regular pause or pause period PZ. Cycle time ZZ is divided into the fixed time in the error-free case from ts to tp of, for example, 850 bit times and the pause time from tp to ts3 of, for example, 50 bit times, once again producing in the example, as mentioned in the case of FIG. 4, the 900 bit times. Accordingly, as shown in FIG. 5a, from ts to tE1 once again the transmission of reference message RN takes place, and from tE1 to tp the transmission of data cycle DZ which is followed by pause period PZ from tp to ts3. The total basic cycle BZ therefore includes according to the present invention reference message RN, data cycle DZ and pause period PZ, the cycle time then including a possible fault and a corresponding delay and hence being capable of being kept constant. This means that the basic cycle according to the present invention of the TTCAN lasts from the beginning of the reference message to the end of a possible pause period PZ. It is not, however, necessary for a pause period to be appended to or included in every basic cycle; a start of the new reference message RN(n+1) either occurs after the end of pause period PZ at time ts3, which has then been transmitted and is valid at time tE3, or alternatively already occurs at the end of data cycle DZ if no pause period is provided in a basic cycle, so that compensation of a deviation occurs in the next basic cycle having a pause period.

If, as previously in FIG. 4b, a fault then occurs in FIG. 5b and a re-start of reference message RN(n) occurs at time tNS, which reference message has been transmitted and is valid at time tE2, and if basic cycle BZ accordingly does not begin until tE2 and that cycle DZ then ends at time tEB, it is possible to correct this by shortening pause period PZ by tEB–tp=tNS–ts. The start of the subsequent reference message RN(n+1) then occurs, as intended, at time ts3 with a shortened pause period. Thus, overall, the time provided for basic cycle BZ and the pause period is shortened. It is possible to obtain a shortened basic cycle time, as is were, by reducing the duration of the pause period, precisely to at least 0.

If the length or duration of pause period PZ is not sufficient to compensate for the delay caused by repetition of the message, it is also possible for the time compensation to be distributed over several basic cycles and pause periods. That distribution may, on the one hand, be specified according to any desired specifiable scheme: ⅔ to the first pause period, ⅓ to the second pause period, or ¼ to the first pause period, half to the second pause period, ¼ to the third pause period, and so on, or distribution may preferably be performed by equal distribution, that is to say equal components corresponding to the number of pause periods within total cycle GZ. That distribution also makes it possible to keep that pause period small, since that time is not available for communication over the bus and thus reduces the possible bus utilization ratio. As shown in FIG. 3, the possible shortening of the cycle time is taken into consideration in the communication matrix.

If such a fault occurs in the case of a plurality of interconnected and synchronized bus systems, it is possible for the correction regarding the time cycle to be carried out also on the other bus system, that is to say, on the bus system where the fault has not occurred, which permits great flexibility in error correction. Shortening of the pause period may also take place on the bus system on which the fault has not occurred, should that be necessary, for example for safety reasons. It would also be possible for the adaptation of the pause period for correction purposes to be distributed over a plurality of bus systems and hence over a plurality of basic cycles of different bus systems. Using a plurality of bus systems therefore provides a very wide variety of options for achieving synchronization by lengthening and shortening pause period PZ. A pause period also does not have to be provided in every basic cycle but may be provided, for example, at the end of every $2^n$th basic cycle or at the end of every $2^n+1$ th basic cycle, where n is a natural number (n∈N), thereby allowing time compensation to be made only at every second (odd or even) cycle in the event of a fault.

Establishing of the delay caused by message repetition of the reference message by determining a correction value is illustrated in FIG. 6. FIG. 6a shows the course of three successive basic cycles, showing in this case fault-free operation. Shown here are the start times of the respective reference messages RN1 to RN4, the times when the respective reference messages RN1 to RN3 are valid and the beginning of the respective pause period PZ1 to PZ3. FIG. 6a shows fault-free operation for the exchange of data. FIG. 6b substantially corresponds to FIG. 6a except that here a fault occurs and the correction of that error by determination of a correction value is shown. The cycle time is updated at each point in time when the reference message is valid, RNvalid. The time between the start of the defective reference message, in this case R3, and the start of the successfully concluded reference message, that is, RN3 Re-start, t76–t66, is ignored and the cycle time counter is synchronized with the beginning of the successfully concluded reference message. Accordingly, the delay caused by the fault cannot be seen at the cycle counter. It is possible for that circumstance to be utilized according to the present invention if the local time is considered in parallel. At any point in time in the basic cycle after the reference message has been received, both cycle time ZZ and local time LZ are read. To calculate the run-time since the last measurement, the difference is found between the local time read and the measurement in the previous basic cycle. As a comparison value, the difference between the basic cycle length and the cycle time read out in the previous basic cycle is calculated and is added to the currently read cycle time. The difference between the calculated local time difference and the calculated comparison value of the cycle time gives the delay due to message repetitions of the reference messages. The respective times in the cycle time are denoted by C and the respective times in the local time by L. Thus, the difference in the local time for determining the correction value in relation to the fault at t76 is given by:

$$tLn=Ln+1-Ln \text{ or, in this case, } tL2=L3-L2.$$

The comparison value for the cycle time is given by:

*tn*Comparison=(length of cycle time *ZZ–Cn+Cn+*1)

or, in this case, by

*t*2Comparison=900 bit times–*C*2+*C*3.

Thus, a correction value K of tL2–t3 Comparison is found. That correction value is the quantity for one-off or distributed shortening of the regular pause period PZ.

What is claimed is:

1. A method for exchanging messages containing data between at least two stations over a bus system, comprising:
   repeatedly transmitting over the bus system, by a first station, a reference message containing time information of the first station at least one specifiable time interval, the time interval being subdivided as a basic cycle into time windows, a pause period of variable duration being provided at an end of at least one basic cycle;
   transmitting messages containing data in at least some of the time windows;
   adapting the duration of the pause period;
   determining a correction value based on a local time of a station and a cycle time, the correction value being used in adapting the duration of the pause period; and
   compensating for a time deviation by correcting a time of a start of the basic cycle, and correcting the time by adapting the duration of the pause period;
   wherein the time of the start of the basic cycle is corrected by one of lengthening and shortening the duration of at least one pause period, and
   wherein the correction value is determined from a comparison value formed by a sum of the time interval of the basic cycle and a second difference between two cycle times of two successive basic cycles, and wherein at least two pause periods are provided in at least two basic cycles for exchanging data, and the correction value is evenly distributed over the at least two pause periods.

2. The method as recited in claim 1, wherein at least two bus systems are synchronized with one another, a time of a start of a basic cycle of a first bus system is corrected by adaptation of the duration of the pause period of a second bus system.

3. The method as recited in claim 1, wherein a pause period is provided at an end of every basic cycle.

4. The method as recited in claim 1, wherein a pause period is provided at an end of every 2nth basic cycle, where n corresponds to a natural number.

5. The method as recited in claim 1, wherein a pause period is provided at an end of every 2n+1th basic cycle, where n corresponds to a natural number.

6. The method as recited in claim 1, wherein, when data is exchanged, a pause period of variable duration is provided at an end of each of at least two basic cycles, by which a change of a start of a beginning of at least one basic cycle is corrected by adaptation of the duration of the at least two pause periods.

7. A device for exchanging data in messages between at least two stations connected by a bus system, comprising:
   a first arrangement at a first station configured to repeatedly transmit a reference message containing time information of the first station over the bus system at least one specifiable time interval;
   a second arrangement configured to subdivide the time interval as a basic cycle into time windows of specifiable length, the messages being transmitted in the time windows;
   a third arrangement configured to provide a pause period of variable duration at an end of at least one basic cycle when data is exchanged, a start of a beginning of the basic cycle being corrected by adaptation of the duration of the pause period; and
   a fourth arrangement to determine a correction value based on a local time of a station and a cycle time, the correction value being used in adapting the duration of the pause period;
   wherein the time of the start of the basic cycle is corrected by one of lengthening and shortening the duration of at least one pause period, and
   wherein the correction value is determined from a comparison value formed by a sum of the time interval of the basic cycle and a second difference between two cycle times of two successive basic cycles and wherein at least two pause periods are provided in at least two basic cycles for exchanging data, and the correction value is evenly distributed over the at least two pause periods.

8. A system having at least two stations for exchanging data in messages between the at least two stations, comprising:
   a bus system which connects the two stations;
   a first arrangement, at a first station, configured to transmit the messages containing the data over the bus system, the first station repeatedly transmitting a reference message containing time information of the first station over the bus system at least one specifiable time interval;
   a second arrangement configured to subdivide the time interval as a basic cycle into time windows of specifiable length, the messages being transmitted in the time windows;
   a third arrangement configured to provide a pause period of variable duration at an end of at least one basic cycle when data is exchanged, a beginning of the basic cycle being corrected by adaptation of the duration of the pause period; and
   a fourth arrangement to determine a correction value based on a local time of a station and a cycle time, the correction value being used in adapting the duration of the pause period;
   wherein the time of the start of the basic cycle is corrected by one of lengthening and shortening the duration of at least one pause period, and
   wherein the correction value is determined from a comparison value formed by a sum of the time interval of the basic cycle and a second difference between two cycle times of two successive basic cycles, and wherein at least two pause periods are provided in at least two basic cycles for exchanging data, and the correction value is evenly distributed over the at least two pause periods.

9. A method for exchanging messages containing data between at least two stations over a bus system, comprising:
   repeatedly transmitting over the bus system, by a first station, a reference message containing time information of the first station at least one specifiable time interval, the time interval being subdivided as a basic cycle into time windows, a pause period of variable duration being provided at an end of at least one basic cycle;
   transmitting messages containing data in at least some of the time windows;
   adapting the duration of the pause period;
   determining a correction value based on a local time of a station and a cycle time, the correction value being used in adapting the duration of the pause period; and
   compensating for a time deviation by correcting a time of a start of the basic cycle, and correcting the time by adapting the duration of the pause period;
   wherein at least two bus systems are synchronized with one another, wherein the time of the start of a basic cycle of a first bus system is corrected by adapting a duration of the pause period of a second bus system, and wherein one of the following is satisfied:

(i) a pause period is provided at an end of every basic cycle, (ii) a pause period is provided at an end of every 2nth basic cycle, where n corresponds to a natural number, (iii) a pause period is provided at an end of every 2n+1th basic cycle, where n corresponds to a natural number, and (iv) when data is exchanged, a pause period of variable duration is provided at an end of each of at least two basic cycles, by which a change of a start of a beginning of at least one basic cycle is corrected by adapting a duration of the at least two pause periods.

10. A method for exchanging messages containing data between at least two stations over a bus system, comprising:

repeatedly transmitting over the bus system, by a first station, a reference message containing time information of the first station at least one specifiable time interval, the time interval being subdivided as a basic cycle into time windows, a pause period of variable duration being provided at an end of at least one basic cycle;

transmitting messages containing data in at least some of the time windows;

adapting the duration of the pause period;

determining a correction value based on a local time of a station and a cycle time, the correction value being used in adapting the duration of the pause period; and compensating for a time deviation by correcting a time of a start of the basic cycle, and correcting the time by adapting the duration of the pause period;

wherein the correction value is determined from a difference between the comparison value and a first difference between two local times of the station in two successive basic cycles, and wherein at least two pause periods are provided in at least two basic cycles for exchanging data, and the correction value is evenly distributed over the at least two pause periods.

* * * * *